(No Model.) 4 Sheets—Sheet 1.

R. R. DOAN.
ROAD ENGINE.

No. 397,976. Patented Feb. 19, 1889.

Witnesses,
Geo. H. Strong.

Inventor
R. R. Doan
by Dewey & Co.
attys (No Model.) 4 Sheets—Sheet 2.

R. R. DOAN.
ROAD ENGINE.

No. 397,976. Patented Feb. 19, 1889.

Witnesses
Geo. H. Strong
J. H. Nourse

Inventor,
R. R. Doan
By Dewey & Co.
Attys (No Model.) 4 Sheets—Sheet 3.
R. R. DOAN.
ROAD ENGINE.
No. 397,976. Patented Feb. 19, 1889.
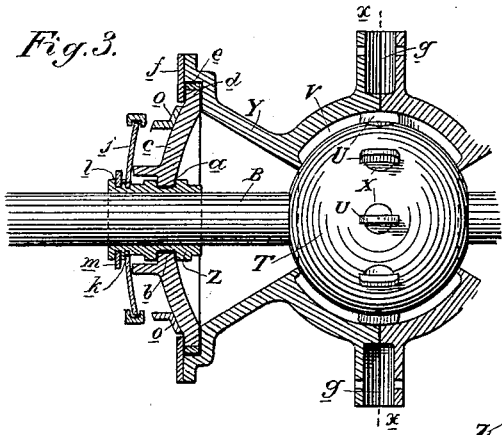
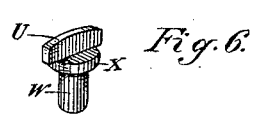
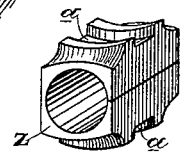
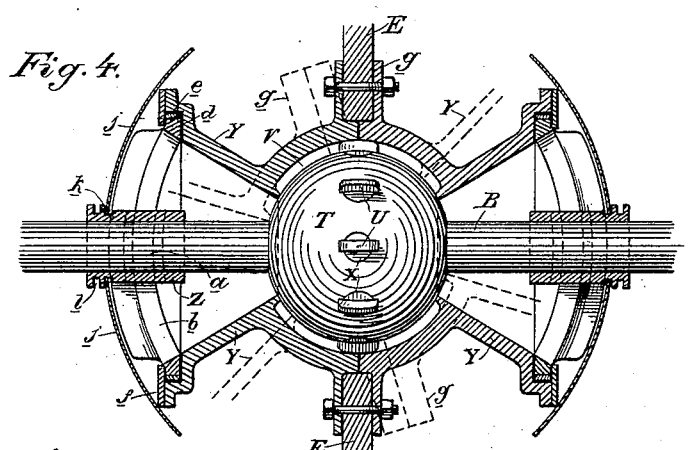
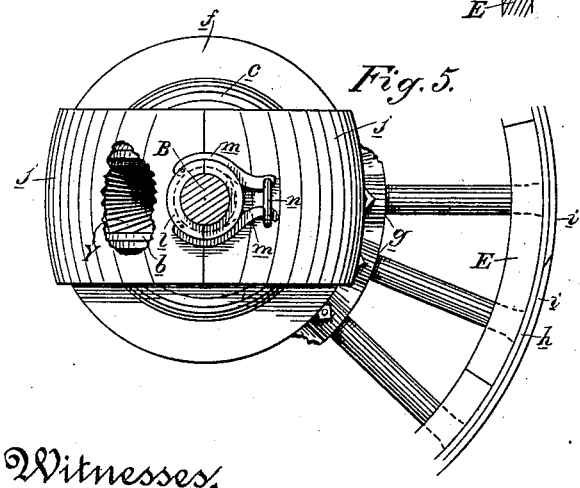
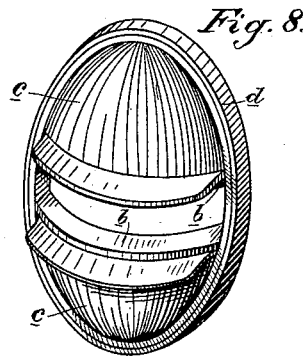
Witnesses,
Geo. H. Strong
Inventor,
R. R. Doan
By Dewey & Co.
atty (No Model.) 4 Sheets—Sheet 4.
R. R. DOAN.
ROAD ENGINE.
No. 397,976. Patented Feb. 19, 1889.
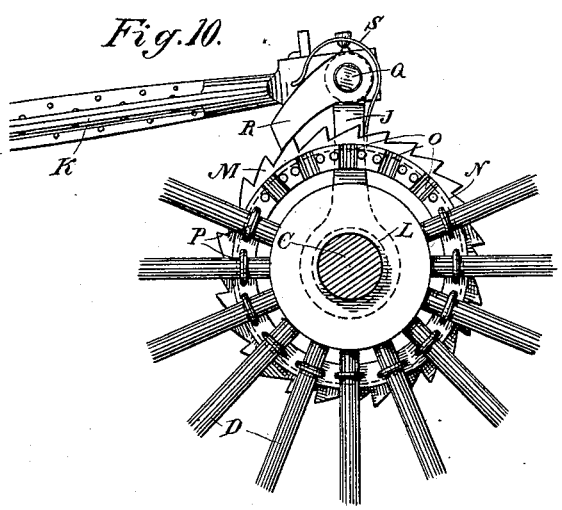
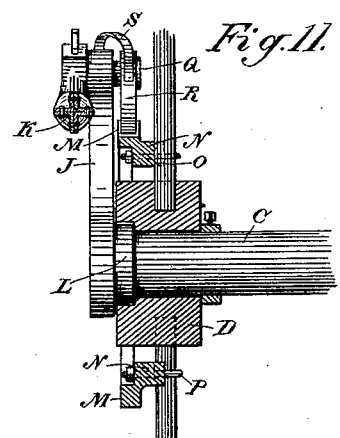
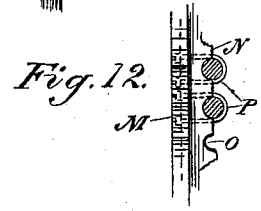
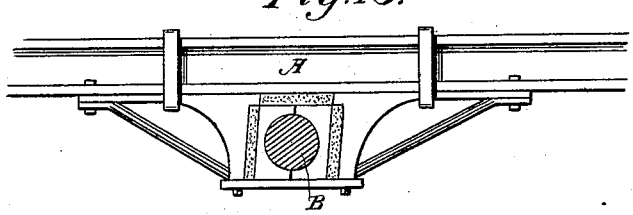
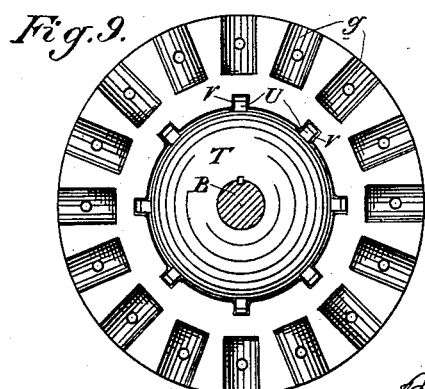
Witnesses,
Geo. H. Strong.
J. H. Rowse.
Inventor,
R. R. Doan
By Dewey & Co.
atty

UNITED STATES PATENT OFFICE.

RILEY ROBISON DOAN, OF SACRAMENTO, CALIFORNIA, ASSIGNOR OF ONE-HALF TO JOHN H. ROBERTS, OF SAME PLACE.

ROAD-ENGINE.

SPECIFICATION forming part of Letters Patent No. 397,976, dated February 19, 1889.

Application filed October 11, 1888. Serial No. 287,860. (No model.)

*To all whom it may concern:*

Be it known that I, RILEY ROBISON DOAN, of Sacramento, Sacramento county, State of California, have invented an Improvement in Road-Engines; and I hereby declare the following to be a full, clear, and exact description of the same.

My invention relates to improvements in that class of machines known as "road-engines;" and it consists of a pair of engines mounted upon a frame and connected with a crank-shaft which is journaled upon said frame, a single bearing-wheel so connected with the rigid crank-shaft as to be driven therefrom, while at the same time it may be turned from side to side in a horizontal plane for the purpose of steering the machine, and in connection therewith of a second crank-shaft journaled upon the frame parallel with the first one, and having a pair of driving-wheels connected with it, the cranks of said shaft being connected with the first shaft by side rods, so as to be moved simultaneously therewith.

It further consists in certain details of construction, all of which will be more fully explained by reference to the accompanying drawings, in which—

Figure 1:
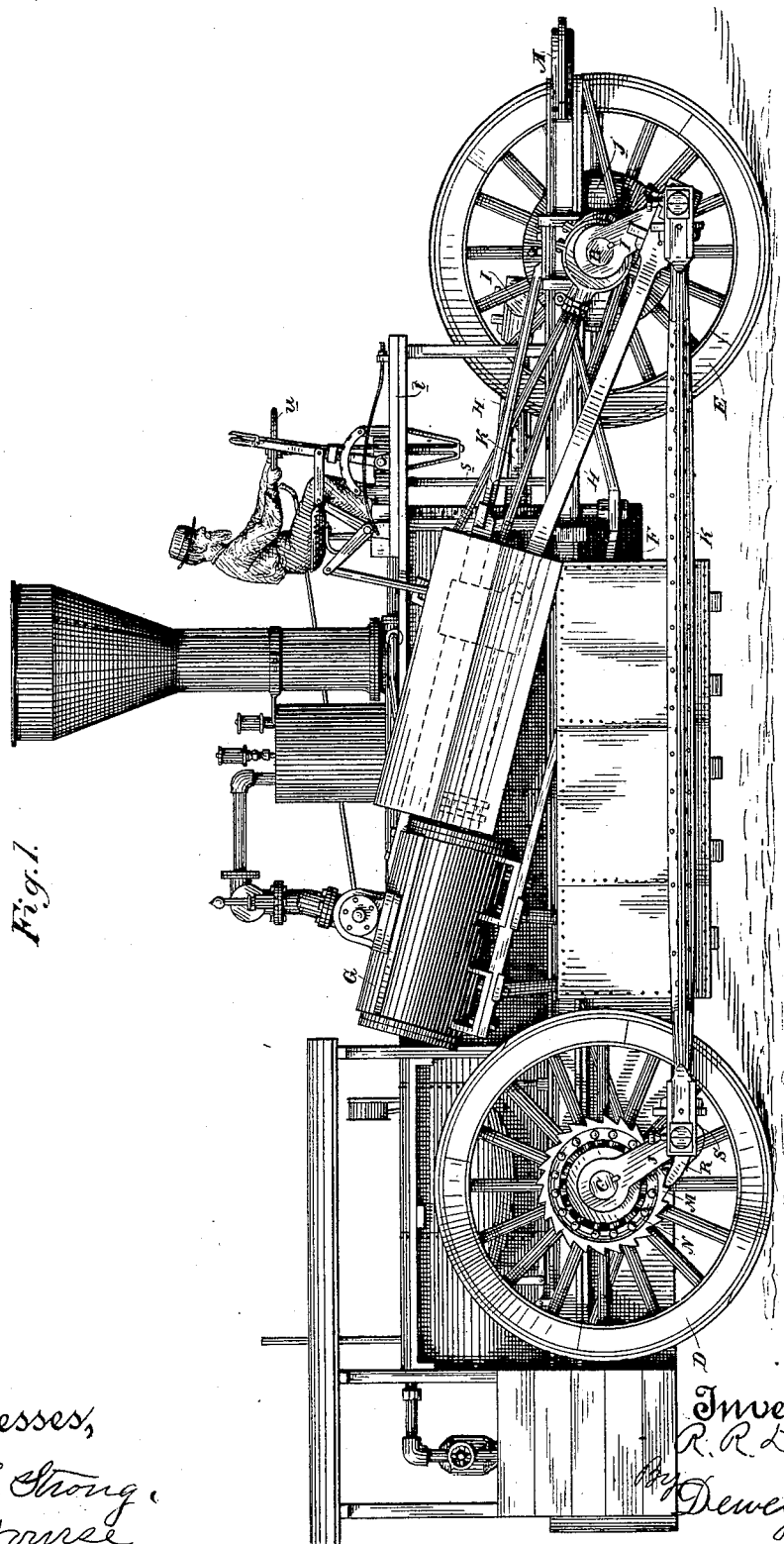
Figure 2:
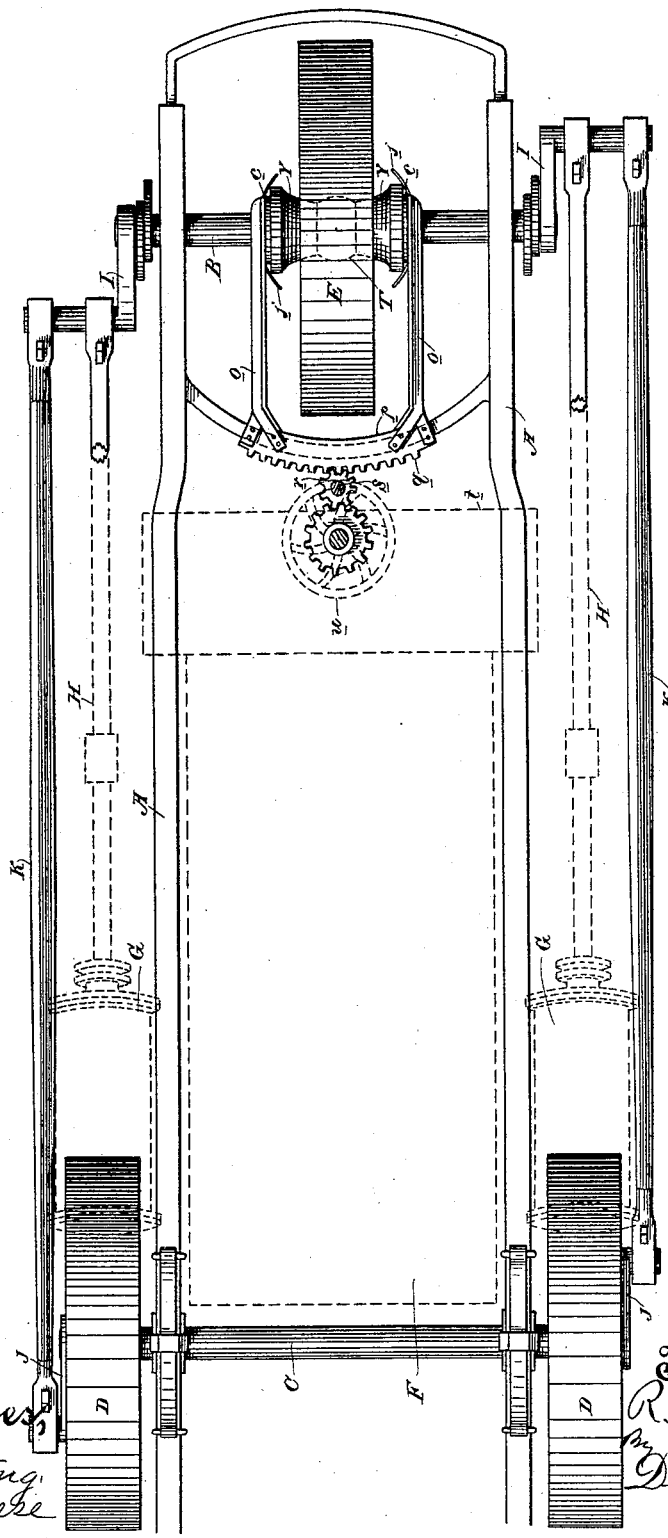

Figure 1 is a side elevation of my machine. Fig. 2 is a plan view of the engine-frame, showing the front and rear driving-axles, bearing-wheels, and a portion of the machinery. Fig. 3 is a vertical section taken through the front wheel in the plane of the longitudinal axis of the shaft. Fig. 4 is a horizontal section of the same. Fig. 5 is an end view of the hub of the front wheel, showing the dust-protector. Fig. 6 is a view of one of the keys. Fig. 7 is a perspective view of one of the hub guide-boxes. Fig. 8 is a perspective view of the hub-guides removed from the end of the hub. Fig. 9 is a vertical section of the front wheel transverse to the shaft to show the ball, its keys, and the slots in the hub into which they fit, the hub and around the axle. Fig. 10 is a view of the ratchet mechanism of the rear wheel, looking outward. Fig. 11 is a vertical section of the rear-wheel hub, showing a part of the crank, the manner of fitting the wheel-hub upon the axle and boss of the crank, and the attachment of the ratchet-wheel to the same. Fig. 12 is a view of a section of the ratchet-wheel and the attachment to the rear-wheel spokes. Fig. 13 is a view of a front-axle outer journal-box.

In my invention I construct an engine-frame, A, having journaled across its front and rear ends the parallel bearing and driving shafts B and C, turning in boxes upon the frame, which maintain them at all times rigidly parallel, but which may be relieved in the direction of the vertical oscillation by means of springs in any suitable manner, which will be more fully explained hereinafter.

Upon the rear axle are fitted the bearing-wheels D, which turn loosely upon the shaft, so as to accommodate themselves to such turns as the machine may make, and in connection with these wheels I employ a pawl-and-ratchet mechanism through which the power of the engines may be applied to drive them, while the pawl-and-ratchet mechanism allows the wheels an independent movement when traveling upon curves.

The front axle has a wheel, E, connected with it at its center by peculiar mechanism, hereinafter described, which allows this wheel to turn from side to side in a horizontal plane for the purpose of guiding the machine, while at the same time power from the engines may be applied to it through its crank-shaft, so that at whatever angle it may turn with relation to its shaft its tractile power may be continuously applied in unison with the rear wheels to drive the machinery.

Upon the engine-frame A is fixed the boiler F, and upon each side are fixed the engine-cylinders G, which in the present case are for convenience shown as standing at an inclination and above and in front of the rear wheels, D. The connecting-rod or pitman H has one end connected with the slide to which the piston-rod of the cylinder is connected, and the opposite end of the pitman connects with the cranks I, one of which is fixed upon each end of the front driving and bearing wheel shaft, B. These cranks are fixed to the shafts in the usual manner at right angles with each other, and upon the rear wheel-shaft, C, are fixed a similar pair of cranks, J, which are united with the front cranks by means of side connecting-rods, K, the ends of which are fitted to the outer ends of the crank-pins with the usual wearing brasses or boxes, so that the movements of both front and rear axle are made in unison, and all the power of the engines is applied directly to both axles and the wheels which they drive.

The hubs of the rear wheels fit and turn snugly upon the outer ends of the shafts or axles C. The outer ends of the hubs are counterbored slightly larger, and the inner ends or hubs of the cranks J are turned down, as shown at L, so as to fit into the counterbores in the rear-wheel hubs, thus allowing the cranks to be fitted closely against the hubs to reduce the width of the machine as much as possible, and also to keep out the dust.

M is a strong ratchet-wheel in the form of a ring, having a stout flange, N, projecting inwardly from it, and the inner edge of this flange has semicircular radial grooves formed in it, as shown at O, so as to fit and clasp each of the spokes of the rear wheel, D, and the whole of the ratchet-wheel is then secured rigidly by means of strong staple-bolts P, which pass around each of the wheel-spokes and through the ratchet-wheel rim, so as to secure the latter firmly to the wheel.

The crank-pins Q of the rear cranks, J, have their inner ends extended inwardly, so as to project over the ratchet-wheels M, and pawls R are fixed upon these inwardly-projecting crank-pins so that their points will engage the teeth of the ratchet-wheels whenever the cranks are being driven so as to propel the machine forward. These pawls are held down by means of springs S, which in the present case I have shown as having one end secured to the side of the crank and the other bent over so as to press upon the pawl. It will be manifest that when turns are being made and either of the wheels travels faster than the other the pawl-and-ratchet mechanism will allow it to move forward, while the propelling-power is temporarily applied to the slower-moving wheel.

The journal-boxes of the rear axle are guided vertically between jaws beneath the engine-frame, and are connected with heavy springs by means of spring-hangers in the same manner that the rear end of a locomotive-frame is suspended. The journal-boxes of the front axle have a slight movement also in similar guiding-jaws, and have rubber or other elastic springs which relieve them somewhat from the shocks of travel upon the road. The jaws in which the front journal-boxes are fitted stand at a slight incline with the engine-frame, so that the slight movement of the journal-boxes will be made exactly at right angles with a line drawn centrally through the engine-cylinder and the center of the shaft B, so that any movement of this box will not alter the distance of the crank-shaft from the cylinder or derange any of the movements of the machinery.

In order to apply the power of the engine through the front shaft, B, to the single wheel E, and at the same time allow this wheel to be turned from side to side, as must be done in order to steer and control the machine, I form the wheel with a large hub having a globular socket in its center, and this socket fits a ball or globe, T, which is strongly secured to the center of the shaft B. Around the center of this globe at intervals I fix keys U, which project from the surface of the globe and fit into correspondingly-shaped channels V, which are made transversely in the interior of the socket of the wheel-hub, as shown in section, Figs. 3, 4, and 9. These keys are made of steel two or three inches in length in the direction of the shaft and with a width and depth to give sufficient strength, so that power applied through the shaft, the balls, and the keys will be transmitted to the wheel through the channels in the interior of the globular socket, in which channels the keys fit snugly and are allowed to travel from end to end of the channels as the wheel is turned to a greater or less angle with the shaft. In the present case I have shown eight of these keys, each having a shank or stem, W, which fits into a corresponding radial hole bored in the ball, and an enlarged portion, X, which forms the head of each of these keys, fits into a large countersunk opening in the ball, thus giving sufficient strength to prevent any breakage at this point. The globular portion of the socket does not entirely surround the ball T; but the outer ends, through which the shaft B enters the hub, are made flaring or funnel-shaped, as shown at Y, the angle of the funnels being such that when the wheel is turned to as great an angle with the shaft as is designed the shaft will stand diagonally near to one side of the funnel-shaped opening at one end of the hub and near to the opposite side of the other funnel-shaped opening at the opposite end of the hub. It will be manifest that when the shaft is in this position the keys U upon the opposite side of the ball T will also stand near opposite ends of the channels V; but the power will be applied to rotate the hub and wheel in the same manner as if they were in the center. I prefer to make the channels V with the ends closed near where the funnel-shaped opening in the hub commences, as they will thus retain the lubricant which is used and prevent its running out.

It will be manifest that with the funnel-shaped openings in the ends of the hub here described some device will be necessary to prevent the wheel wabbling about upon the ball and shaft. This consists of guide-boxes Z, which fit the shaft B and within which it turns. These guide-boxes have grooves or channels $a$ made upon the top and bottom, as shown in Fig. 7, and these grooves are curved in an arc which has the center of the globe T as its center. These grooves fit upon guides $b$, having the same curve and radius. These guides are formed in disks $c$, having flanges $d$, which fit in circular grooves or channels $e$, formed in the outer ends of the funnel-shaped hubs, as shown plainly in Figs. 3 and 4. This allows the wheel to rotate, while the disks maintain a constant position with relation to the guide-boxes, which do not rotate. The disks $c$, as shown in Fig. 8, are formed with a horizontal opening extending from one side to the other, within which the box Z is allowed to travel from one side to the other, or so far as the turn of the wheel may render it necessary, and, while from this construction the wheel may turn to a considerable angle in a plane parallel with these channels, it will be seen that on account of the flanges $d$ fitting in the grooves $e$ it will be impossible for the wheel to tip either to the right or left in a vertical plane. These disks may be made in various ways; but I prefer to cast them in one piece and then strengthen them with steel or iron bands shrunk upon the outside, as shown in Fig. 8. The grooves or channels $e$ are formed in the outer ends of the funnel-shaped hubs Y, and the rings $f$ are bolted or secured upon the outer faces of the hubs, projecting inwardly a sufficient distance to form the channels within which the flanges $d$ fit and turn.

The hub of the front wheel, E, is made in two halves vertically, in order to allow the socket to be fitted over the exterior of the ball T. These two halves are bolted together after the ball is in place, and radial sockets $g$, half of which are formed in each of the two halves of the hub, serve to receive the spokes of the wheel, which are bolted or secured into these sockets and extend radially to the wheel-rim, where they fit into similar sockets, which are bolted to the interior of the rim. The wheel-rims $h$ are made of steel having a broad tread, and in order to protect them from the action of rocks and rough roads I fit over them supplemental tires $i$, which are made in sections and may have their meeting ends beveled, so as to slightly overlap, because the constant shocks and blows of travel on the road will gradually stretch out and lengthen these sections, and at intervals they must be cut and reriveted. The sections allow of this slight stretching without permitting the tire to become loose upon the rim.

In order to protect the open ends of the funnel-shaped hubs from the dust and dirt, I employ gates or doors $j$. These doors slide in grooves or channels and fit closely against the outer edges of the flanges, which project horizontally from the disks $c$ above and below the horizontal openings in which the hub-guide boxes Z travel. These doors are made in two halves, which abut in the center, fitting and bolted to brass channeled segments $k$, which segments exactly fit the shaft B. Exterior to the doors $j$ grooves $l$ are formed in the segments $k$, and latches $m$ are curved so as to fit into these grooves or channels. At one end these latches are pivoted to one of the segments $k$, so that they may be opened when necessary, and the curved doors $j$ may be slid outward each way from the shaft, thus exposing the interior of the hub for inspection. When the doors are slid together, so as to close about the shaft B, the latches $m$ are closed, so as to lie in the grooves or channels $l$ of the segments, and by means of the link $n$, which is pivoted to the end of one of the latches $m$, the two may be drawn together and clamped, so as to hold the latter together, the free end of the link $n$ fitting over the curved or hook-shaped end of one of the latches $m$, as shown in Fig. 5. By this construction it will be seen, as shown in Fig. 4, that the wheel E may be turned to whatever angle is necessary when steering the machine, and the doors $j$, clasping the shaft B just outside of the box Z, will allow the hub to move to either side, the doors sliding backward or forward upon it to accommodate themselves to its movements.

In order to guide the wheel E and turn it from side to side, arms $o$, which are made of angle-iron, are bolted to the disk $c$ above and below the horizontal openings, and these arms extend rearwardly and are bolted to a plate, $p$, behind the rim of the wheel E, this curved plate or segment having its radius from the center of the globe T, which is the center of motion about which the steering, as well as the rotation of the wheel, is accomplished. To the rear of the segment $p$ is fixed a curved rack, $q$, which is engaged by the teeth of the pinion $r$, secured to a vertical shaft, $s$, which extends up through the platform or deck $t$, upon which the engineer sits, and by means of a hand-wheel, $u$, upon the upper end of this shaft, or upon a second shaft having intermediate gearing between it and the shaft $s$, the engineer turns it, causing the rack $q$ to travel from one side to the other, carrying with it the wheel E to any desired angle. The segment $p$ and the rack $q$ travel in a horizontally-curved guide, which keeps them in position vertically, while allowing them to move in the arc of a circle from one side to the other.

In the present case I have shown a horizontal tubular locomotive-boiler, and at the rear end is a platform and cab for the fireman, while the engineer sits upon the deck or platform $t$, having the throttle and reverse levers closely at hand and the steering-wheel $u$ in front, so that he can guide the engine wherever it may be desired.

Great difficulty has been experienced in driving these engines upon rough mountain roads on account of the crystallization and breaking of certain parts from the constant shocks to which they are exposed. The side connecting-rods, K, have been subject to this difficulty, and I therefore make them of four angle-iron bars, which abut together in the center, the flanges projecting upward, downward, and to right and left horizontally, as shown in section, Fig. 11. These bars are bolted together, and the ends are filled in with metal, which is welded up, so as to make them solid, and the stub ends for the journal boxes and straps are welded into these solid ends, thus forming a rigid and powerful side bar. These bars may further be stiffened by truss-rods extending from end to end and over projections or standards at the middle of the bars $k$ in the usual manner for such trusses. By this construction I am enabled to apply the power of the engines directly to two parallel driving-shafts, which power is constantly transmitted to the rear and the front wheels, while the latter may be turned from side to side for the purpose of guiding the machine without losing any of its tractile force.

Having thus described my invention, what I claim as new, and desire to secure by Letters Patent, is—

1. A traction-engine having rear wheels mounted upon the ends of a driving crank-shaft journaled upon the engine-frame, and a single front wheel fitted with a ball-and-socket joint, with grooves and keys, upon the center of a second driving crank-shaft journaled upon the engine-frame parallel with the first shaft, and having power transmitted to it from the engine, substantially as herein described.

2. A traction-engine having parallel horizontal shafts turning in boxes at the front and rear ends of the frame, respectively, cranks upon the ends of the shaft through which motion is transmitted from an engine carried upon the frame, loosely-turning wheels fitted upon the rear shaft, and a pawl-and-ratchet mechanism by which they are connected therewith, in combination with a front wheel fitted to the front shaft by means of a ball-and-socket joint and driving-keys, and a steering mechanism connected with said front wheel, so that it may be turned from side to side independent of the rotary motion of its shaft, substantially as herein described.

3. A traction-engine having its rear end supported upon bearing-wheels, the shaft of which turns in boxes upon the engine-frame, a forward shaft parallel therewith, and cranks by which power is transmitted to said shafts from the engine, in combination with a ball fixed to the center of the forward shaft, having keys projecting from its periphery, a forward wheel having the hub formed with a socket, and transverse channels which fit the ball and keys and allow the wheel to be moved from side to side while power is transmitted to it from the shaft, substantially as herein described.

4. In a traction-engine, the parallel crank-shafts journaled upon the engine-frame and receiving power through the cranks from an engine carried upon said frame, wheels fitting the outer ends of the rear crank-shaft and connected therewith by pawl-and-ratchet mechanism, a front wheel, the hub of which forms a globular socket fitting a corresponding ball secured to the front shaft, keys projecting from the periphery of said ball and entering transverse slots in the hub, through which power is transmitted to drive said wheel, and disks fitting in circular grooves in the outer ends of the hub, with horizontal openings from side to side, having boxes through which the shaft passes, said boxes traveling from side to side on guides within the horizontal openings of the disks, substantially as herein described.

5. An engine-frame having the parallel bearing and driving shafts at the front and rear of the frame, wheels mounted upon the rear axle with pawl-and-ratchet connections, as shown, and a single front wheel having the spherical socket with transverse channels, a ball secured to the shaft fitting said socket and having radial keys projecting and fitting into the channels, funnel-shaped hubs projecting outwardly from the spherical socket and having concentric grooves or channels with curved guides $b$, and boxes $z$, within which the wheel-shaft turns, said boxes having groove $a$, fitting upon the guides $b$, substantially as and for the purpose herein described.

6. The forward driving-shaft journaled upon the frame, the ball-and-socket connection, and driving-keys and channels, whereby the wheel is propelled by the shaft, the projecting funnel-shaped hubs having the disks C, fitted to turn in concentric channels in their outer ends, and the guiding-boxes Z, fitting the shaft and traveling on horizontal guides within the disks, in combination with the arms $o$, the segmental rack $q$, and the steering-wheel and pinion, substantially as herein described.

7. The forward driving-shaft journaled in boxes upon the engine-frame and having the ball fixed to its center with projecting keys, as shown, the wheel having the spherically-socketed hub with transverse channels fitting the ball and the keys, the horizontal traveling guiding-boxes, and guides in the outer ends of the funnel-shaped hub of the wheel, in combination with the horizontal sliding doors $j$, whereby the openings at the ends of the hubs are kept closed, substantially as herein described.

8. The doors $j$, traveling in guides and having their inner ends secured to the segments $k$, which fit the driving-shaft, said segments having grooves or channels $l$, in combination with the clasps or latches $m$ and the links $n$, substantially as herein described.

9. The ball or sphere secured to the forward driving-shaft having the countersunk holes made radially in its periphery, in combination with the keys U, having the shanks W, and the enlargements or heads X, fitting into the radial holes and countersunk openings, substantially as herein described.

10. The wheel-hub composed of two sections bolted together, having the spherical channeled socket formed between said sections to fit and inclose the ball secured to the driving-shaft, with keys fitting the channels in the hub, radial semi-sockets upon the exterior of the hub-sections, into which the inner ends of the wheel-spokes are introduced, and bolts whereby the sections are secured over the ball and spokes locked in place, substantially as herein described.

11. An engine-frame having the forward shaft journaled upon it, a forward guiding and driving wheel with ball and socket, keys and horizontal guides and steering mechanism, the rear wheel-shaft journaled upon the frame parallel to the front shaft, and the wheels D, fitting loosely upon the ends of said shaft, having their outer ends countersunk to fit over the hubs of the cranks J, in combination with the ratchet-wheels M, clamped to the wheel-spokes, as shown, the pawl R, and the springs S, substantially as herein described.

12. The rear wheels of a traction-engine, turning loosely upon the rear crank-shaft, which is journaled upon the engine-frame, and the ratchet-rims clamped to the wheels, as shown, in combination with cranks having crank-pins projecting outwardly to receive the ends of the connecting-rods from the engine and the inner ends projecting inwardly and carrying pawls R, together with the springs S, fixed to the cranks and acting upon the pawls, substantially as and for the purpose herein described.

13. The side and connecting rods composed of angle-iron bars riveted together, with the angles meeting on a common axial line, substantially as herein described.

14. The side and connecting rods composed of angle-iron bars riveted together, with the interior angles upon a common axial line, the filling-pieces, and the stub ends welded thereto, substantially as herein described.

15. A road-locomotive consisting of a frame having rotary parallel axles and rigid connections between them, whereby said axles may be driven in unison and remain parallel, wheels on said axles, and a pivotal connection between a wheel or wheels and one of the axles, whereby the former may be turned from side to side on the axle to guide the machine while still receiving power and being driven by the axle, substantially as herein described.

16. A road-locomotive consisting of a frame with parallel shafts or axles journaled thereto, cranks, and connecting-rods by which said axles receive power from the engine and are united to move in unison, wheels mounted upon said axles so as to be propelled by them, and a mechanism whereby the steering-wheel may be turned from side to side upon one of the axles, so as to guide the machine, while receiving motion from the axle whose plane of rotation is unchanged, substantially as herein described.

17. A road-locomotive consisting of a frame having rotary parallel axles, cranks, and connecting-rods uniting the axles, whereby they may be driven in unison and remain parallel, a wheel on each end of one axle, a single wheel pivotally connected with the other axle, whereby it may be turned from side to side to guide the machine, and a power-connection between said single wheel and its axle, whereby the wheel is driven by the axle without regard to its angle with said axle, substantially as herein described.

In witness whereof I have hereunto set my hand.

RILEY ROBISON DOAN.

Witnesses:
H. C. CHIPMAN,
J. H. SMITH.